United States Patent
Alshehri et al.

(10) Patent No.: US 9,643,861 B1
(45) Date of Patent: May 9, 2017

(54) METHOD FOR PREPARING AN ADSORBENT FOR REMOVING ORGANIC DYES FROM WATER

(71) Applicant: KING SAUD UNIVERSITY, Riyadh (SA)

(72) Inventors: Saad M. Alshehri, Riyadh (SA); Tansir Ahamad, Riyadh (SA); Mu Naushad, Riyadh (SA); Jahangeer Ahmed, Riyadh (SA); Zeid A. Al-Othman, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 15/364,233

(22) Filed: Nov. 29, 2016

(51) Int. Cl.
*C02F 1/28* (2006.01)
*B01J 20/22* (2006.01)
*B01J 20/30* (2006.01)
*C02F 1/66* (2006.01)
*C02F 101/30* (2006.01)
*C02F 103/30* (2006.01)
*C02F 103/24* (2006.01)

(52) U.S. Cl.
CPC ............. *C02F 1/286* (2013.01); *B01J 20/22* (2013.01); *B01J 20/3071* (2013.01); *C02F 1/66* (2013.01); *C02F 2101/308* (2013.01); *C02F 2103/24* (2013.01); *C02F 2103/30* (2013.01); *C02F 2303/16* (2013.01)

(58) Field of Classification Search
CPC ... C02F 1/286; C02F 1/66; B01J 20/22; B01J 20/3071
See application file for complete search history.

(56) References Cited

U.S. PATENT DOCUMENTS

| | | | | |
|---|---|---|---|---|
| 6,090,292 | A * | 7/2000 | Zimmermann | C07K 14/765 210/500.24 |
| 7,906,149 | B2 * | 3/2011 | Yarborough | A61K 9/0014 424/520 |
| 2007/0181499 | A1 * | 8/2007 | Roberts | A61M 1/3472 210/645 |

FOREIGN PATENT DOCUMENTS

CN 105251468 A 1/2016

OTHER PUBLICATIONS

Mondal et al., "Eggshell Powder as an Adsorbent for Removal of Fluoride from Aqueous Solution: Equilibrium, Kinetic and Thermodynamic Studies," E-Journal of Chemistry, 2012, 9(3) 1457-1480.

* cited by examiner

*Primary Examiner* — Chester Barry
(74) *Attorney, Agent, or Firm* — Richard C. Litman

(57) ABSTRACT

A method for preparing an adsorbent for removing organic dyes from water includes providing a volume of egg white, adding a volume of formaldehyde to the volume of egg white to form a mixture, maintaining a pH of the mixture at about pH 8.5, stirring the mixture until a viscous product is formed, and washing and drying the product to provide the adsorbent.

14 Claims, 5 Drawing Sheets

METHOD FOR PREPARING AN ADSORBENT FOR REMOVING ORGANIC DYES FROM WATER

BACKGROUND OF THE INVENTION

1. Field of the Invention

The present invention relates generally to adsorbents, and particularly, to an egg white-based polymeric resin for adsorbing organic dyes from wastewater.

2. Description of the Related Art

Synthetic dyes are extensively used in many industries such as textile, cosmetics, leather tanning, printing, dyeing, food coloring, and paper production. Every year, a considerable volume of dye-laden effluents from these manufacturing industries infiltrates water systems of many countries around the world. The release of colored wastewater into bodies of water can cause significant harm to aquatic animals and plants. Methylene blue (MB), one of the representative dyes, is widely used in cottons, wools and silks dyeing, paper coloring as well as in paints and manufacturing printing inks. However, acute exposure to methylene blue can cause a series of physiological responses such as increased heart rate, vomiting and shock. Therefore, the proper treatment of dye effluents prior to their discharge into water sources has become increasingly important.

Various technologies, including adsorption, coagulation/flocculation, advanced oxidation processes, ozonation, membrane filtration, and biological treatment, have been developed for removing dye contaminants from wastewater. Of these methods, the adsorption technique has been found to be an economical and effective treatment method for removing dyes due to its sludge-free and clean operation.

Thus, a method for preparing an adsorbent for removing organic dye such as methylene blue from wastewater thereby solving the aforementioned problems is desired.

SUMMARY OF THE INVENTION

A method for preparing an adsorbent for removing organic dyes from water includes providing a volume of egg white, adding a volume of formaldehyde to the volume of egg white to form a mixture, maintaining a pH of the mixture at about pH 8.5, stirring the mixture until a viscous product is formed, washing and drying the product to provide the adsorbent. The adsorbent is a solid, white powder and a thermosetting polymeric resin. The adsorbent can have an adsorption capacity of about 11.2 mg/g after 24 hours contact time with the water at a temperature of about 25° C. and a pH of 10.0.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
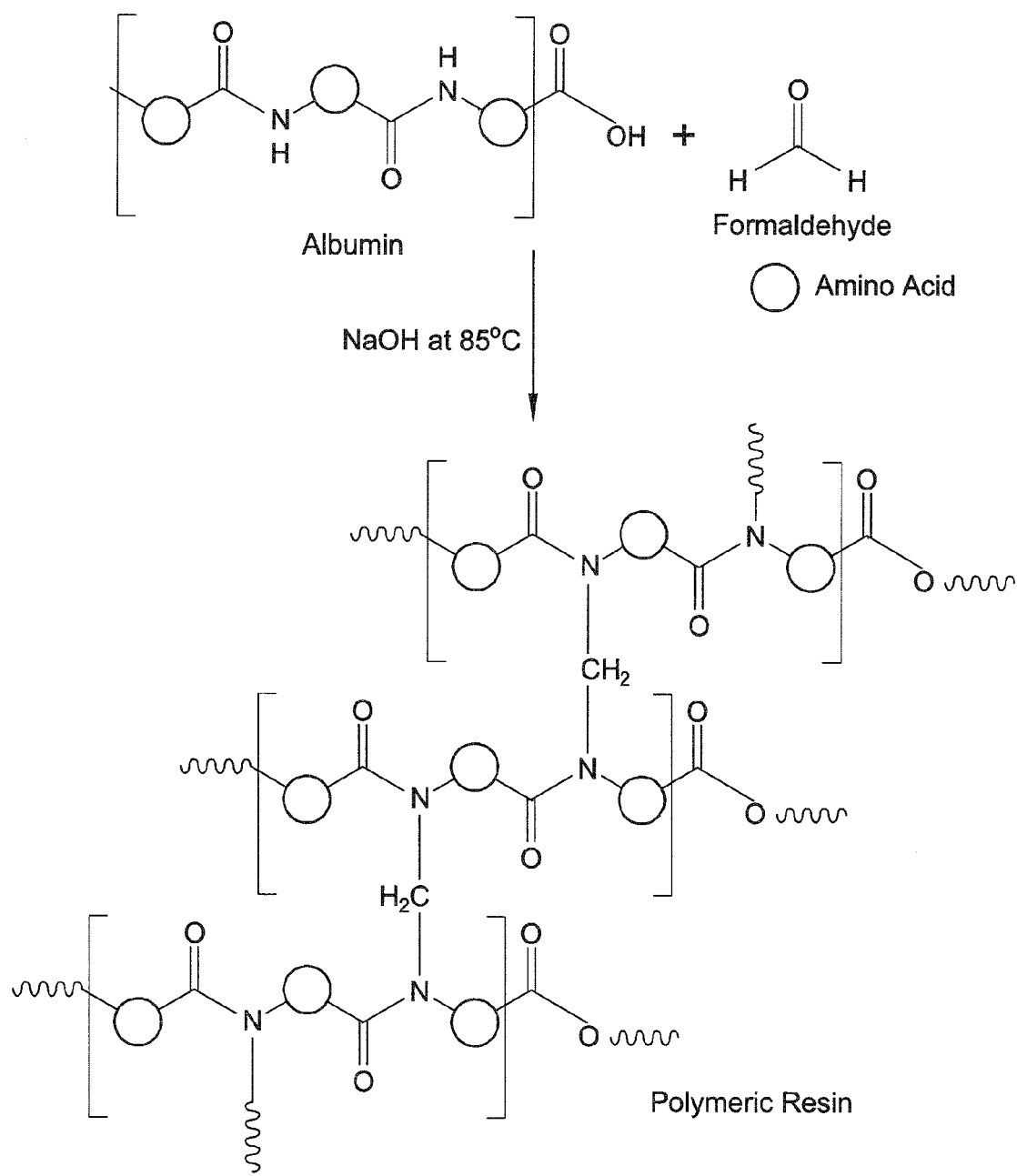
FIG. 1 is a diagrammatic reaction scheme showing the synthesis of the adsorbent prepared according to the present invention.

A method for preparing an adsorbent for removing organic dyes from water includes reacting egg white with a formaldehyde solution. The reaction can occur at a pH level ranging from about pH 8 to about pH 10, and preferably pH 8.5. The reaction can occur at ambient temperature. The product of the reaction is the adsorbent, an egg white-based polymeric resin, which can be used for adsorbing organic dyes from water. The polymeric resin is a thermosetting resin which becomes an infusible, insoluble polymer network upon curing by heating.

The adsorbent can be contacted with water contaminated with organic dyes to adsorb the organic dyes therefrom. The adsorption can be carried out at room temperature and a pH of the water can range from about pH 8 to about pH 10. The equilibration time for the adsorption process can be up to 24 hours. An optimum dose of the adsorbent can be about 25 mg/25 ml. The organic dye can be any organic dye, such as methylene blue. The adsorbent can have an adsorptive capacity of about 11.2 mg/g$^{-1}$ when the adsorbent has been contacted with the water for period of about 24 hours at pH 10.0 and at a temperature of about 25° C. Once the adsorbent has adsorbed the organic dye, the adsorbent can be regenerated or cleaned by contacting the adsorbent with a regenerating solution. Once regenerated, the adsorbent can be reused for removing organic dyes from water. The regeneration solution can be an acidic solution, such as a dilute HCl solution.

As defined herein, "egg white" refers to the white, protective gelatinous substance surrounding the yolk of a bird's egg, e.g., a chicken's egg. The egg white includes mainly albumin. The egg white albumin includes several amide groups which can react with the formaldehyde solution. The formaldehyde solution can include urea formaldehyde and/or thiourea formaldehyde. The adsorbed dye can be desorbed using a regenerating solution, comprising dilute aqueous solution of HCl. As such, the adsorbent is reusable.

As further described in the examples below, the adsorbent (egg white-based polymeric resin) is an ideal nano-adsorbent for removing an organic dye from water, e.g., wastewater and/or groundwater. Although methylene blue has been used as an exemplary dye, the adsorbent can be used to remove other organic dyes and other pollutants. Advantageously, the adsorbent has high surface charge and can remove methylene blue dye (>90.0%) from aqueous solution when the uptake time is as low as 40 minutes. The present method of removing dyes is clean and safe, as compared to existing methods.

The following examples will further illustrate the process for removing organic dyes from water.

Example 1

Synthesis of Adsorbent

About 20 mL of egg white was placed in a 100 mL round-bottom flask, and 10 mL of 37% formaldehyde was added drop wise to the flask. The pH of the solution was maintained at 8.5 using aqueous NaOH solution. The mixture was stirred at 85° C. for 6 hours; resulting in a viscous product, which was precipitated with diluted HCl solution. The resulting white precipitate was washed off using distilled water, ethanol, and acetone, and then dried in a vacuum oven under reduced pressure at 60° C. for 24 hours to provide the adsorbent. The adsorbent was a white, spongy, solid powder.

Figure 2:
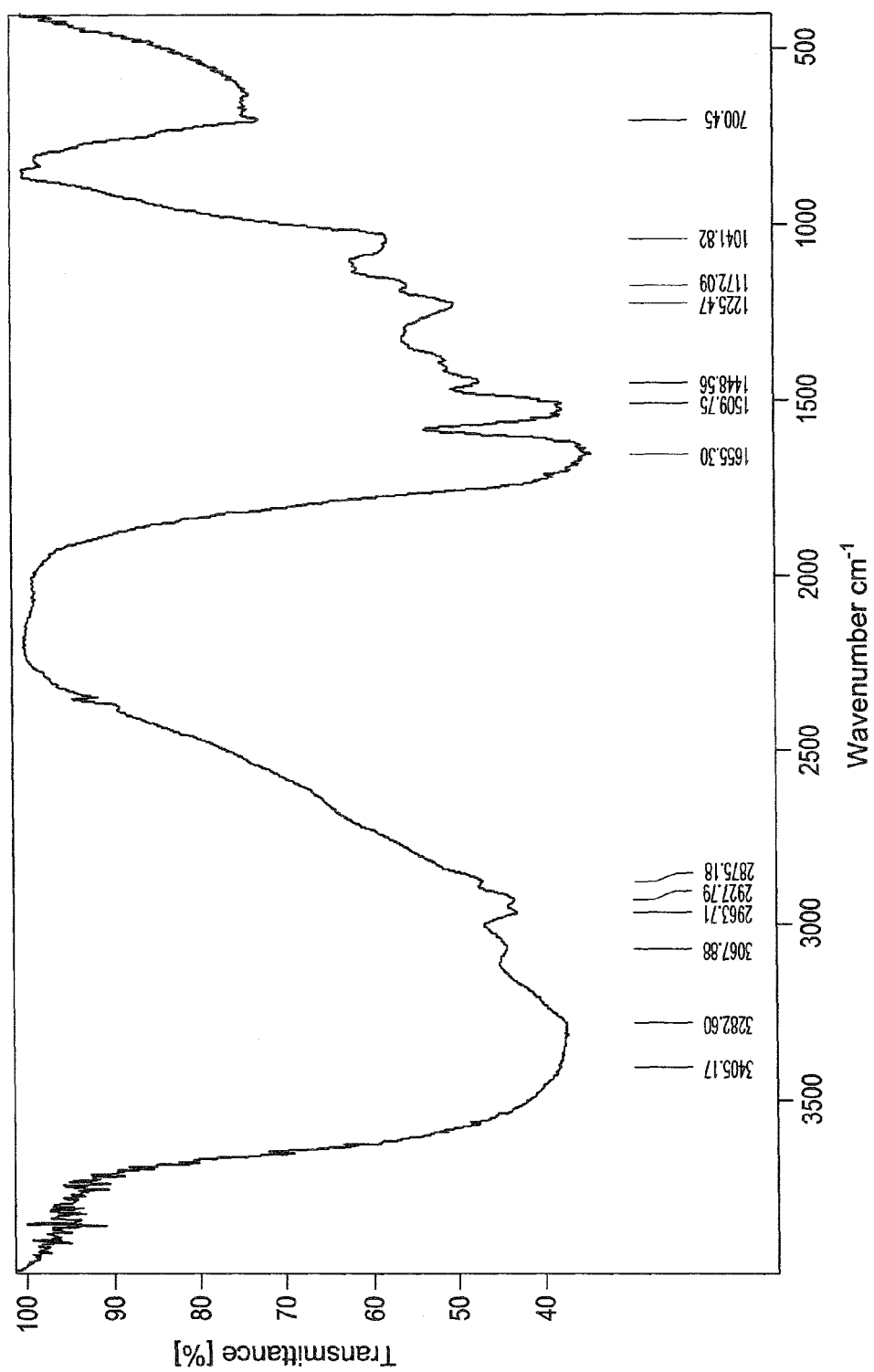
FIG. 2 is a FTIR spectrum of the adsorbent used in a method for removing organic dye from wastewater according to the present invention.

FIG. 1 depicts the reaction scheme showing the synthesis of the adsorbent wherein the albumin from the egg white reacts with formaldehyde, to form the adsorbent polymeric resin. FIG. 2 shows the Fourier Transform Infra-Red (FTIR) spectrum of the adsorbent.

Example 2

Adsorption of Methylene Blue

Figure 3:
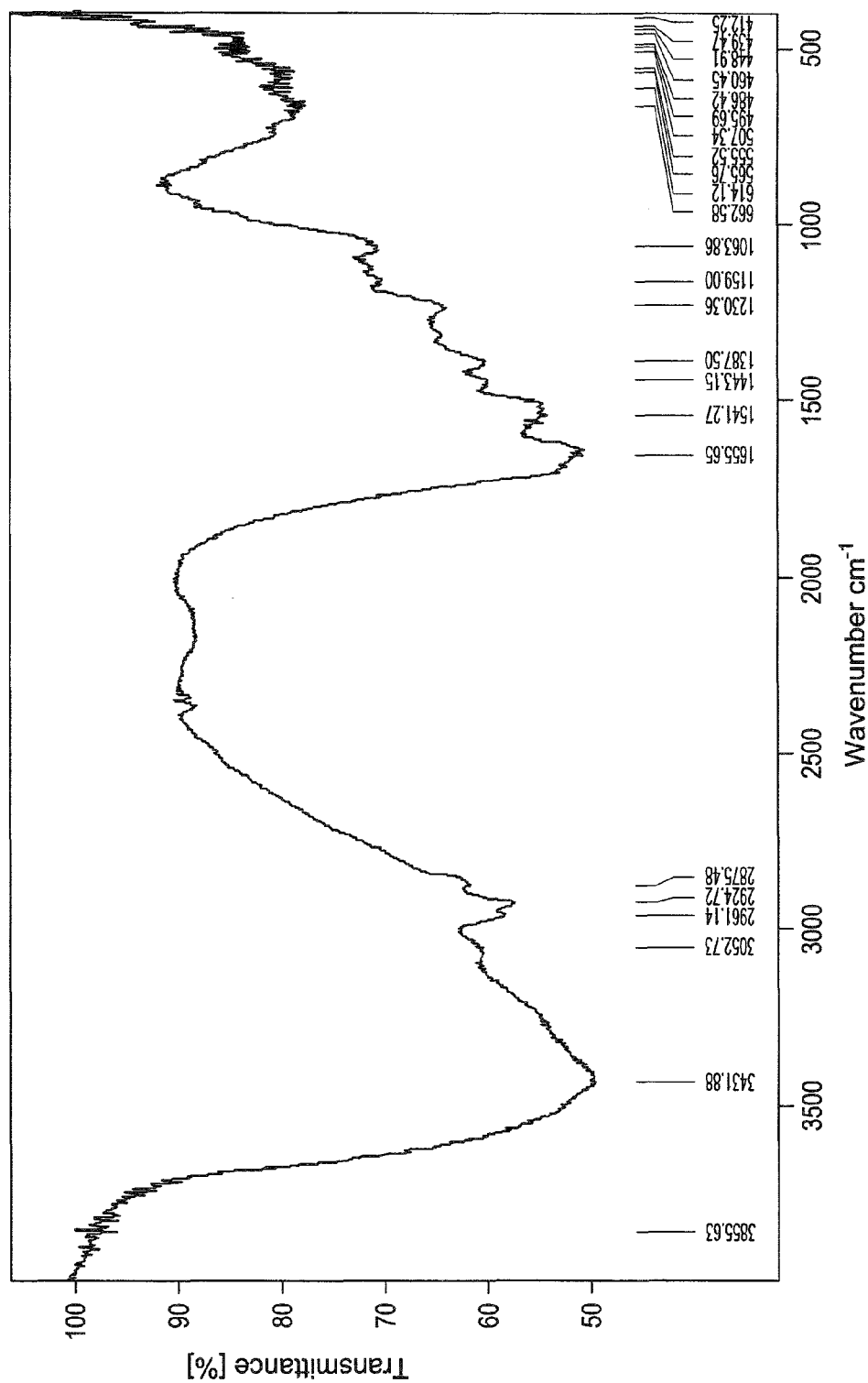
FIG. 3 is a FTIR spectrum of the adsorbent after adsorption of methylene blue from wastewater according to the present invention.
Figure 4:
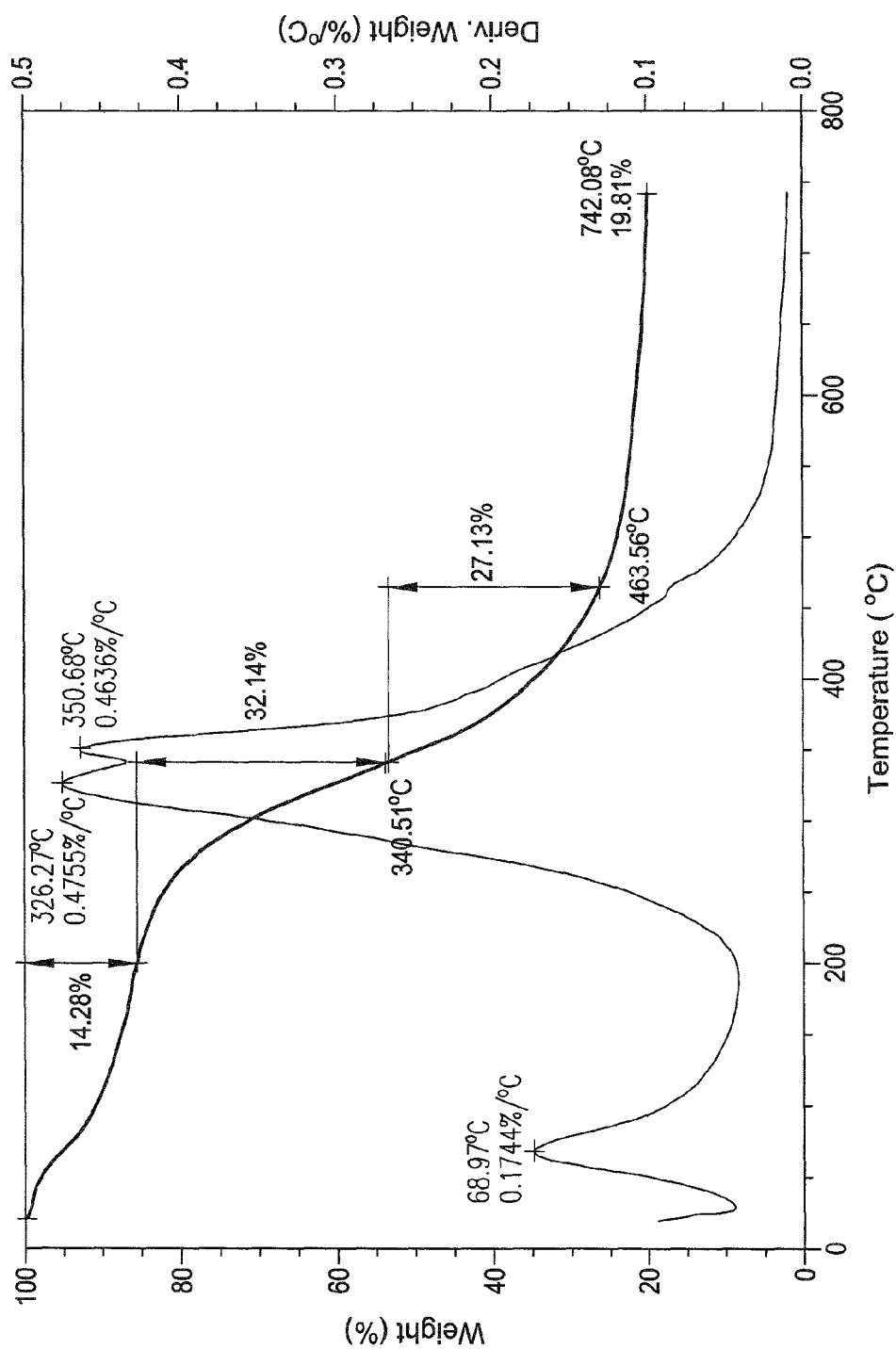
FIG. 4 is a thermogravimetric analysis (TGA) curve of the adsorbent prior to adsorbing the organic dye from wastewater according to the present invention.
Figure 5:
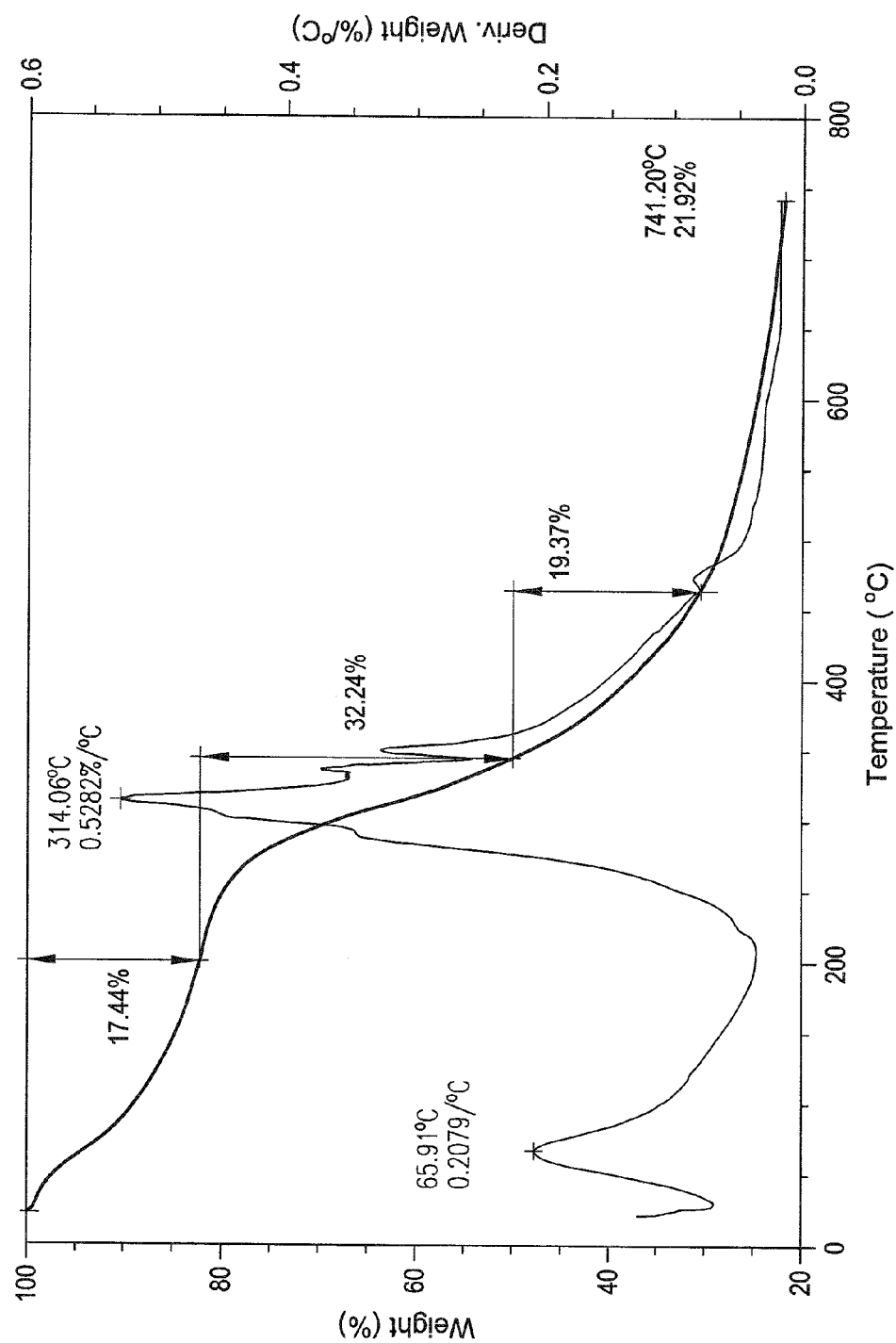
FIG. 5 is a thermogravimetric analysis (TGA) curve of the adsorbent after adsorption of the organic dye from wastewater according to the present invention.

The adsorption of methylene blue (MB) dye by the adsorbent was carried out by a batch method. The adsorption trials were carried out in 100 ml glass conical flasks. Initially, about 25 mg egg white based polymeric resin was added to 25 mL of methylene blue solution of 100 ppm in a conical flask, which was placed in a thermostatic shaking assembly. The test flasks were sealed to prevent change in volume of the solution during the experiments. The solution was stirred continuously at constant temperature for a time to achieve equilibration. After equilibration, the adsorbent was filtered off using a Whatman filter No. 41. The concentrations of methylene blue in the solution phase before and after adsorption were determined using a double beam UV-Vis spectrophotometer at 665 nm. A number of parameters (such as contact time, pH, initial methylene blue concentration and temperature) were changed in order to optimize the adsorption process. FIG. 3 shows the FTIR spectrum of the adsorbent (polymeric resin) after adsorption of methylene blue from wastewater. FIG. 4 and FIG. 5 are thermogravimetric analysis (TGA) curves of the adsorbent before and after adsorption of methylene blue dye from wastewater, respectively.

The amount of adsorbed dyes at equilibrium, Qe (mg/g), and the percent adsorption (%) of dyes were computed using equation 1 below:

$$Q_e = V(C_0 - Ce)W \times 1000 \quad (1)$$

where, V is the volume of dye solution in liters, $C_0$ and Ce are the initial and final concentrations (mg L$^{-1}$) of dye in solution and W is the weight in grams of the methylene blue dye.

It was found that that the adsorption of methylene blue depended on pH and contact time. The optimum pH for the adsorption of methylene was in the range of 8-10 and the shaking/contact time necessary for equilibrium was 24 hours.

It is to be understood that the present invention is not limited to the embodiments described above, but encompasses any and all embodiments within the scope of the following claims.

We claim:

1. A method for preparing an adsorbent for removing organic dyes from water, comprising the steps of:
   providing a volume of egg white;
   adding a volume of formaldehyde to the volume of egg white to form a mixture, the volume of egg white being about twice the volume of formaldehyde;
   maintaining a pH of the mixture at a level ranging from about pH 8 to about pH 10;
   stirring the mixture until a viscous product is formed;
   washing the viscous product to provide a washed product; and
   drying the washed product to provide the adsorbent.

2. The method for preparing an adsorbent for removing organic dyes from water according to claim 1, wherein the formaldehyde is 37% formaldehyde.

3. The method for preparing an adsorbent for removing organic dyes from water according to claim 1, wherein the pH of the mixture is maintained by adding NaOH solution to the mixture.

4. The method for preparing an adsorbent for removing organic dyes from water according to claim 1, wherein the mixture is stirred at a temperature of about 85° C. for about 6 hours.

5. The method for preparing an adsorbent for removing organic dyes from water according to claim 1, wherein the adsorbent is a thermosetting resin.

6. An adsorbent for removing organic dyes from water prepared according to the method of claim 1.

7. A method for removing organic dyes from water, comprising the steps of:
   contacting the adsorbent of claim 6 with water contaminated with organic dye for a period of time sufficient to adsorb the organic dye.

8. The method for removing organic dyes from water according to claim 6, further comprising:
   regenerating the adsorbent after adsorbing the organic dye by contacting the adsorbent with an acidic solution; and
   removing the organic dye from the adsorbent by the acidic solution.

9. The method for removing organic dyes from water according to claim 8, wherein the acidic solution is dilute HCl.

10. The method for removing organic dyes from water according to claim 7, further comprising adjusting a pH of the water to a pH level ranging from about pH 8 to about pH 10.

11. The method for removing organic dyes from water according to claim 7, wherein the period of time is at least about 40 minutes.

12. The method for removing organic dyes from water according to claim 7, wherein an optimum concentration of the adsorbent is about 25 mg/25 ml.

13. The method for removing organic dyes from water according to claim 7, wherein the organic dye is methylene blue.

14. The method for removing organic dyes from water according to claim 7, wherein an adsorptive capacity of the adsorbent is about 11.2 mg/g.

* * * * *